US011901622B2

(12) United States Patent
Sevilla

(10) Patent No.: US 11,901,622 B2
(45) Date of Patent: Feb. 13, 2024

(54) MITIGATION OF INTERMODULATION DISTORTION IN ANTENNA MONITORING DERVICES

(71) Applicant: VIAVI SOLUTIONS INC., San Jose, CA (US)

(72) Inventor: Thomas Sevilla, Miramar, FL (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 50 days.

(21) Appl. No.: 17/655,478

(22) Filed: Mar. 18, 2022

(65) Prior Publication Data

US 2023/0299474 A1 Sep. 21, 2023

(51) Int. Cl.
*H01Q 1/52* (2006.01)
*H01Q 1/24* (2006.01)

(52) U.S. Cl.
CPC ............... *H01Q 1/52* (2013.01); *H01Q 1/243* (2013.01)

(58) Field of Classification Search
CPC ............ H01Q 1/24; H01Q 1/243; H01Q 1/44; H01Q 1/52; H01Q 1/521
See application file for complete search history.

(56) References Cited

U.S. PATENT DOCUMENTS 9,947,988 B2 4/2018 Takashima et al.
2018/0069575 A1* 3/2018 Kong ........................ H04B 1/10
2019/0280732 A1* 9/2019 Moon .................... H01Q 1/525
2021/0314009 A1* 10/2021 Sjöland ................... H03F 3/211

* cited by examiner

*Primary Examiner* — Thai Pham
(74) *Attorney, Agent, or Firm* — DLA Piper LLP (US)

(57) ABSTRACT

An example antenna monitoring device according to the disclosed principles is provided with an intermodulation distortion mitigation component. An example intermodulation distortion mitigation component may include a backplate for the antenna monitoring device. The back plate may be made of a substance such as aluminum and may be relatively thin (e.g., in the order of 0.5 mm thickness). When the antenna receives signals, the backplate may block signals with intermodulation distortions from reaching the antenna. When the antenna is to transmit signals, the backplate may block the transmitted signals passing through the antenna monitoring device thereby avoiding the introduction of intermodulation distortion.

20 Claims, 5 Drawing Sheets

100

300

400

500

MITIGATION OF INTERMODULATION DISTORTION IN ANTENNA MONITORING DERVICES

BACKGROUND

Modern communication systems rely heavily on wireless signals transmitted and received by antennas. On the transmit side, antennas receive fluctuating electrical currents through wires from connected circuitry and generate wireless signals as electromagnetic fields corresponding to the fluctuating electrical currents. On the receive side, antennas convert electromagnetic fields of the received wireless signals to electrical currents carried through wires to the connected circuitry. Because of directional oscillation of electrical and magnetic fields, wireless signaling through the transmittal and receipt of electromagnetic fields is inherently directional: heavily influenced by the location of the signal source, multipathing, beamforming, and or other aspects associated with electromagnetic fields and electromagnetic radiation. Therefore, for an optimal bandwidth and signal strength, antennas—both on the transmit and receive sides—may require precise alignments and tuning with respect to each other.

Antenna monitoring devices are generally used for supervision of physical antenna attributes such as azimuth, tilt and or roll, which can be used to aid in alignment or tuning of antennas. An antenna monitoring device is generally an electronic device that is mounted (generally permanently) on the antenna or a structure supporting the antenna. Within the antenna monitoring device, electronic and magnetic components measure antenna tuning parameters and or a directional alignment of the antenna in terms of antenna roll, tilt, and or azimuth. Feedback provided by the antenna monitoring device, e.g., through an interface, may be used to tune the antenna and or adjust the alignment of the antenna to a desired roll, tilt, and or azimuth.

The operation of the antenna monitoring devices, however, may impact the operation of the antennas. Components of the antenna monitoring devices may introduce intermodulation: the components may produce non-linearity in the signals transmitted and or received by the antennas, where the non-linearity may generate several harmonics that may cause channel distortion. For example, harmonics of two signals in a channel may interact at other channels at a higher frequency thereby introducing distortions to the other channels. As the antenna monitoring devices are generally permanently attached to the antenna or a support structure thereof, such distortions may cause loss of antenna sensitivity, signal loss, and or other undesired effects on the antenna.

There have been no available solutions to mitigate intermodulation distortions introduced by antenna monitoring devices. As such, a significant improvement upon the antenna monitoring devices is desired.

SUMMARY

Embodiments disclosed herein attempt to solve the aforementioned technical problems and may provide other solutions as well. An example antenna monitoring device according to the disclosed principles is provided with an intermodulation distortion mitigation component. An example intermodulation distortion mitigation component may include a backplate for the antenna monitoring device. The back plate may be made of a substance such as aluminum and may be relatively thin (e.g., in the order of 0.5 mm thickness). When the antenna receives signals, the backplate may block signals with intermodulation distortions from reaching the antenna. When the antenna is to transmit signals, the backplate may block the transmitted signals passing through the antenna monitoring device thereby avoiding the introduction of intermodulation distortion.

In an example embodiment, an antenna monitoring device is provided. The antenna monitoring device may be affixed to an antenna or a support structure associated with the antenna. The antenna monitoring device may include a housing enclosing antenna monitoring circuitry configured to measure one or more antenna monitoring parameters. The antenna monitoring device may further include an intermodulation distortion mitigation component coupled to the housing and configured to block at least a portion of radio frequency signals distorted by intermodulation effects generated by one or more components of the antenna monitoring device.

In another example embodiment, an electronic device is provided. The electronic device configured to be affixed to an antenna or a support structure associated with the antenna. The electronic device may include a housing enclosing electronic circuitry configured to detect one or more antenna parameters. The electronic device may further include an intermodulation distortion mitigation component coupled to the housing and configured to block at least a portion of radio frequency signals distorted by intermodulation effects generated by one or more components of the electronic device.

In yet another example embodiment, a method of manufacturing an antenna monitoring device is provided. The method may include providing antenna monitoring circuitry within a housing of an antenna monitoring device, the antenna monitoring circuitry configured to measure one or more antenna monitoring parameters. The method may further include coupling a backplate to the housing of the antenna monitoring device, the backplate configured to block at least a portion of radio frequency signals distorted by intermodulation effects generated by one or more components of the antenna monitoring device.

It should be understood that this summary just provides example embodiments for a quick introduction of the disclosure and therefore should not be considered limiting.

Figure 1:
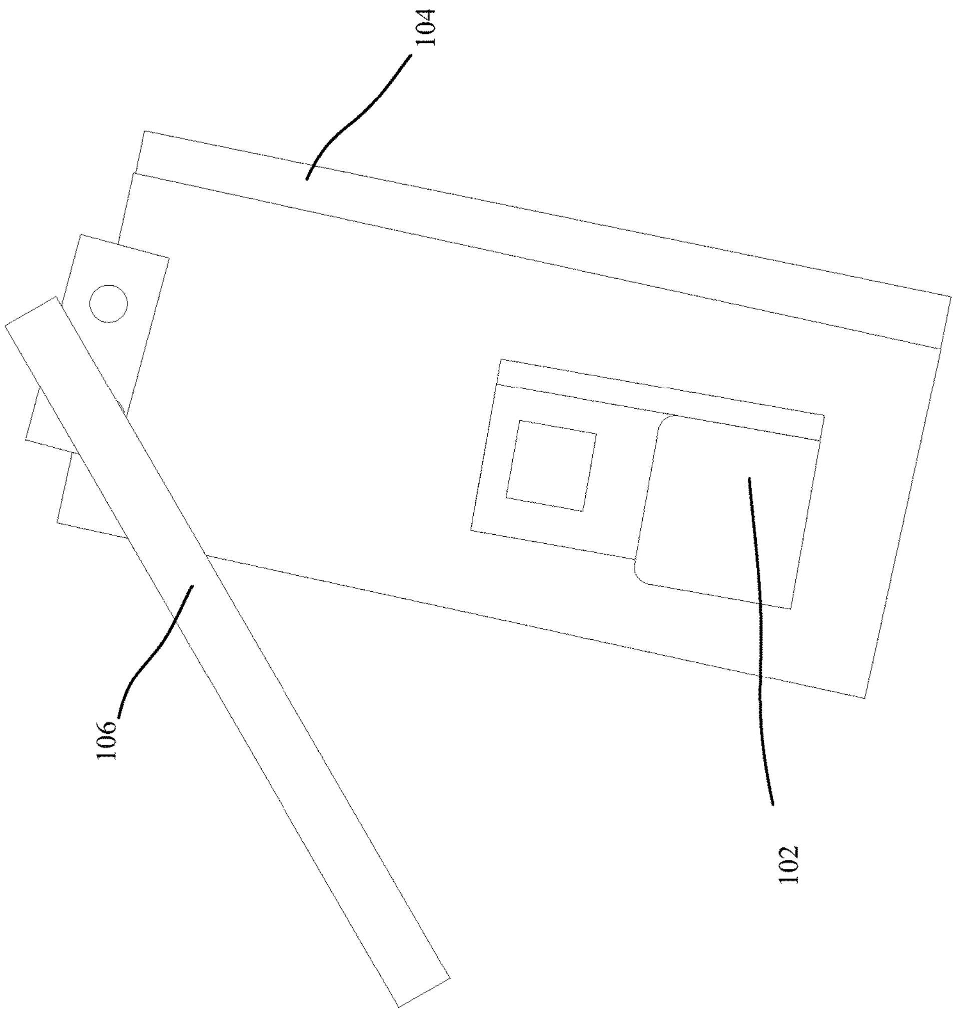
FIG. 1 shows an example environment for antenna monitoring, based on the principles disclosed herein.

It should be understood that the drawings are just for illustrating the principles disclosed herein and therefore should not be considered limiting.

DETAILED DESCRIPTION OF SEVERAL EMBODIMENTS

Antennas are susceptible to outside interference. Particularly, antennas in a cellular phone network that may have relatively smaller inter-channel separation may be very susceptible to outside interference, which may cause dropped calls. An example of a such a cellular phone network is the 5$^{th}$ generation mobile network (5G). The outside interference may come from passive sources such as rusty couplers, nearby ferric (e.g., metallic) objects, etc. The outside interference may also come from active devices such as nearby powered electronic devices.

Therefore, any kind of antenna monitoring device, antenna alignment device, and or electronic device close to the antenna may introduce interference (referred to herein as outside interference) in the antenna operation. This outside interference may comprise intermodulation, which may be a passive intermodulation from passive components of the devices and or active intermodulation from active components of the devices. Particularly, the components of the devices may produce non-linearities and generate harmonics of the signals passing through a channel, where the harmonics may interact with each other causing distortions to nearby channels. Such channel distortion may reduce antenna sensitivity, cause dropped calls, and or cause other signal related problems.

Embodiments disclosed herein describe an example of intermodulation distortion mitigation component in antenna monitoring devices, antenna alignment devices, and or any kind of electronic devices near the antenna. For example, a plate that may be coupled to a back side of antenna monitoring device (or any side abutting or facing the antenna) may block signals with intermodulation distortions from reaching the antenna. Furthermore, the plate may block transmitted signals from reaching the electronic and or magnetic components of the antenna monitoring device thereby avoiding the intermodulation distortion.

Any suitable material may be used for the backplate. For example, the backplate may be made of a non-ferrous material such as aluminum. The backplate may also be relatively thin, e.g., in the order of 0.5 mm. The thickness may be based on the amount of intermodulation distortion mitigation desired, which in turn may be based on strength of the transmitted signal, amount of intermodulation distortion generated, etc. The non-ferrous nature and a relatively thin and smooth form factor may allow the backplate to mitigate intermodulation effects, e.g., through signal blocking, without generating its own intermodulation distortions. The smoothness of the backplate may be generated by machining the backplate to have smooth edges. In other words, the machining may be done to avoid hard edges (and or other deformities), which may cause intermodulation.

Although the below examples describe intermodulation distortion mitigation for antenna monitoring devices, the description is just for explanation purposes only and it should be understood that intermodulation distortion mitigation for any kind of electronic device close to the antenna should be considered within the scope of this disclosure. Furthermore, the aluminum backplate with thickness of 0.5 mm is also just an example and it should be understood that any suitable material with any suitable thickness should also be considered within the scope of this disclosure.

FIG. 1 shows an example environment 100 for antenna monitoring, based on the principles disclosed herein. The example environment 100 includes an antenna 104, which may be disposed on a support structure 106. The shown support structure 106 is just an example, and the antenna 104 may be located on any type of suitable support structure such as e.g., an antenna tower, rooftop, treetop, building wall, vehicle top, satellite, and/or the like. Furthermore, the antenna 104 can be any type of antenna, including a dome antenna, a sector antenna, a microwave antenna, an omnidirectional antenna, a loop antenna, a multibeam antenna, a Yagi-type antenna, and/or any type of antenna that may have to be aligned for optimal performance. In some embodiments, the antenna 104 may be a part of a cellular telephony network such as 5$^{th}$ generation mobile network (5G). More particularly, the antenna 104 may be a part of a base station of the cellular telephony network. Because of a relatively smaller inter-channel distances within the cellular telephony network, particularly 5G, the antenna 104 may be particularly susceptible to intermodulation distortions, as further described below.

An antenna monitoring device 102 may be used for monitoring the antenna 104. For example, the antenna monitoring device 102 may output alignment information such as roll, tilt, and/or azimuth. Using the alignment information, a user may monitor the antenna 104 to determine whether it has maintained a desired roll, tilt, and/or azimuth. For example, the antenna monitoring device 102 may upload the monitored parameters (e.g., roll, tilt, and or azimuth) to a remote device (e.g., a cloud server), which may then be accessed to determine whether the antenna 104 has maintained its desired alignment. As used herein antenna monitoring parameters may include antenna alignment parameters (e.g., roll, tilt, and or azimuth) and or any type of antenna tuning parameters.

The antenna monitoring device 102—while allowing for a continuous or near-continuous monitoring of the antenna 104—may introduce undesired intermodulation distortions on the signals received and or transmitted by the antenna 104. The intermodulation distortions may be introduced due to the non-linear responses of the various components of the antenna monitoring device 102 to the signals being received and or transmitted by the antenna. To mitigate the intermodulation distortions, a backplate (not shown in FIG. 1 but described with reference to FIGS. 2-3 below) may be used. The backplate may block the distorted signals from reaching the antenna 104 and or block transmitted signals from the antenna 104 from passing through the antenna monitoring device 102. More generally, the black plate may form a radio frequency shield between the antenna monitoring device 102 and the antenna 104 such that: (i) the antenna 104 may not receive signals that have passed through the antenna monitoring device 102 and or (ii) signals transmitted from the antenna 104 may not pass through the antenna monitoring device 102.

Although the above description recites a backplate as the intermodulation distortion mitigation component, it is merely intended as an example, and any kind of form factor (e.g., not necessarily a plate like structure) should be considered within the scope of this disclosure.

Figure 2:
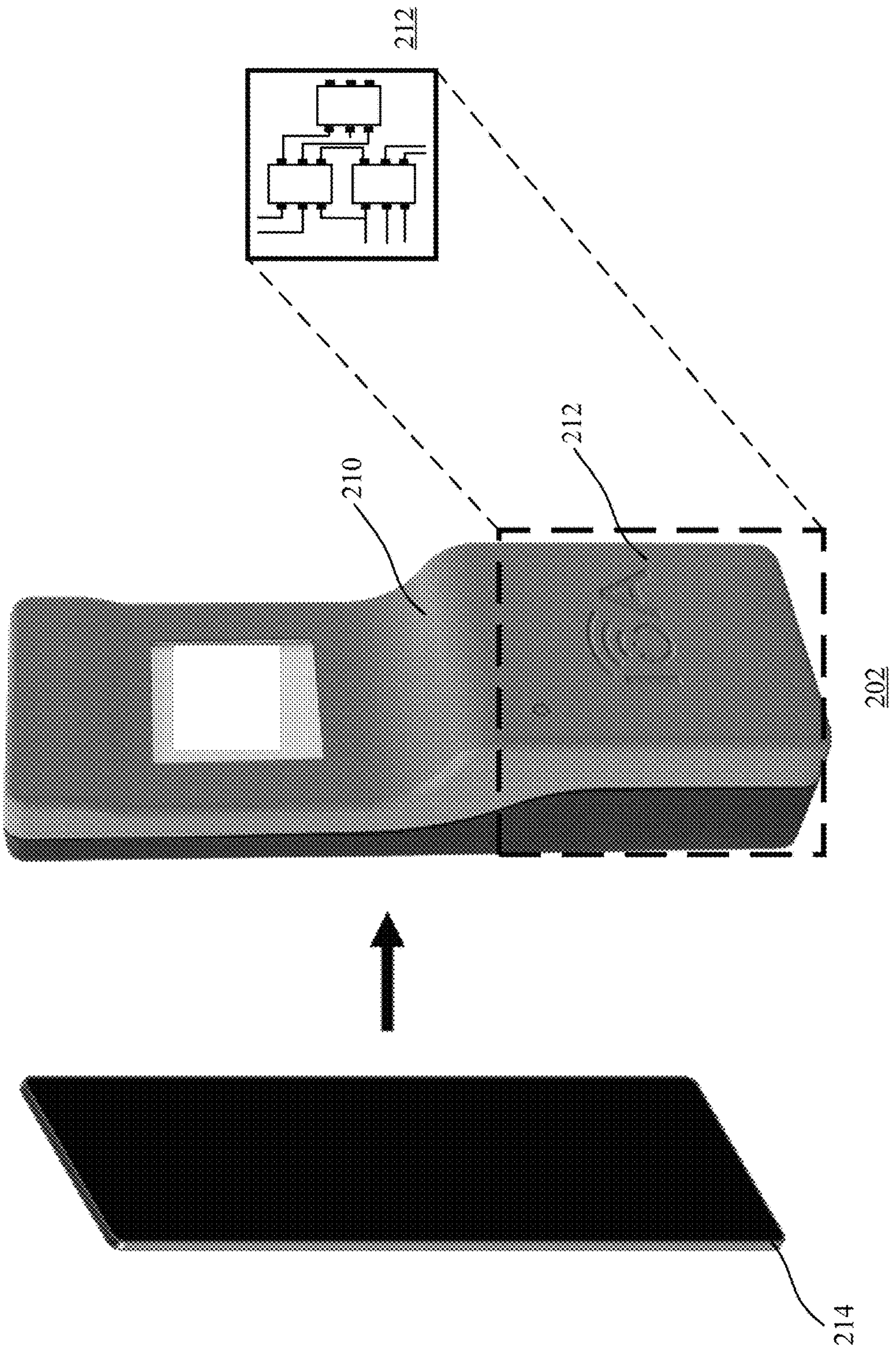
FIG. 2 shows an example intermodulation distortion mitigation component to be coupled to an antenna monitoring device, based on the principles disclosed herein.

FIG. 2 shows an example intermodulation distortion mitigation component 214 to be coupled to an antenna monitoring device 202, based on the principles disclosed herein. As shown, the intermodulation distortion mitigation component 214 may be coupled as a backplate 214 to a housing 210 of the antenna monitoring device 202. The housing 210 of the antenna monitoring device 202 may include antenna monitoring circuitry 212, e.g., electronic and or magnetic component that may calculate the roll, tilt, and or azimuth of the antenna. The backplate 214 may be coupled to the housing 210 through any kind of attaching or coupling mechanism such as adhesive, welding, using screws, etc. In some embodiments, the intermodulation distortion mitigation component 214 may be formed of aluminum. The intermodulation distortion mitigation component 214 may be relatively thin, e.g., with a thickness of about 0.5 mm. The intermodulation distortion mitigation component 214 may also be machined smooth avoiding hard edges and or other deformities. If not smoothed, the hard edges and or the other deformities themselves may introduce intermodulation distortions.

When coupled to the antenna monitoring device 202, the intermodulation distortion mitigation component 214 may block signals with intermodulation distortions from reaching the antenna. These intermodulation distortions may have been introduced to the signals being received by the antenna. On the transmit side, the intermodulation distortion mitigation component 214 may block transmitted signals from passing through the components of the antenna monitoring device, thereby avoiding the introduction of intermodulation distortions. The intermodulation distortion mitigation components 214 may generally operate as a radio frequency shield, blocking radio frequency signals with intermodulation distortions from reaching the antenna and or blocking radio frequency signals from the antenna from passing through the components of the antenna monitoring device 202.

Figure 3:
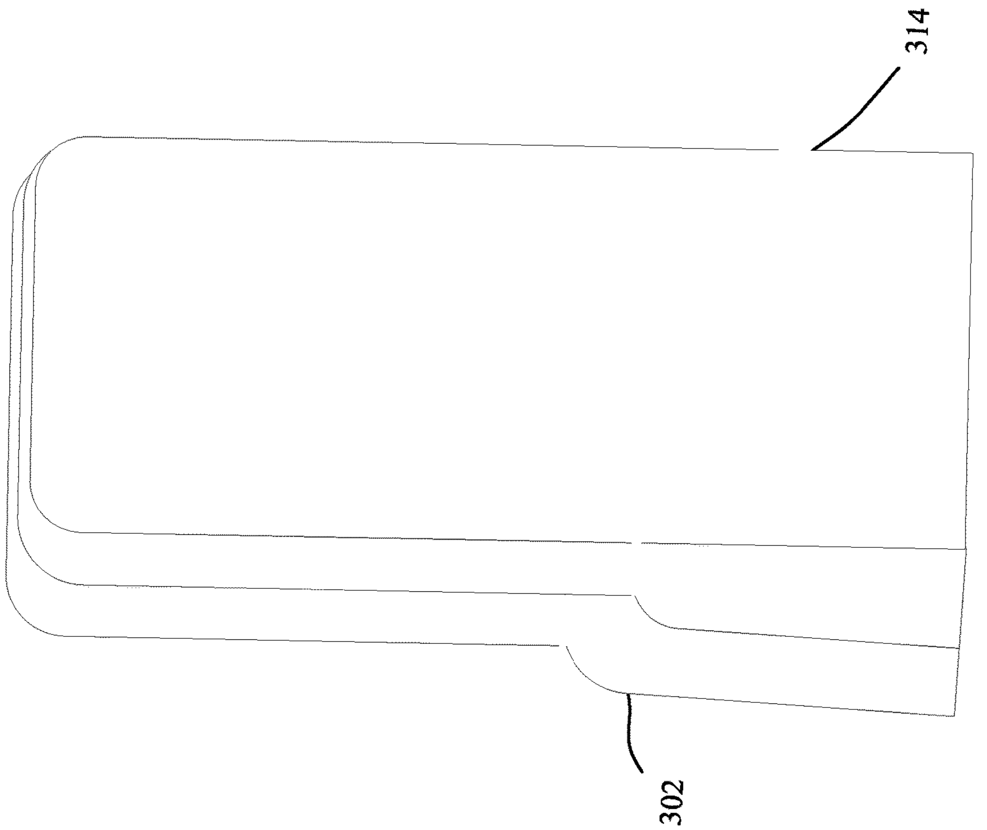
FIG. 3 shows an example of antenna monitoring device with an intermodulation distortion mitigation component coupled thereto, based on the principles disclosed herein.
Figure 4:
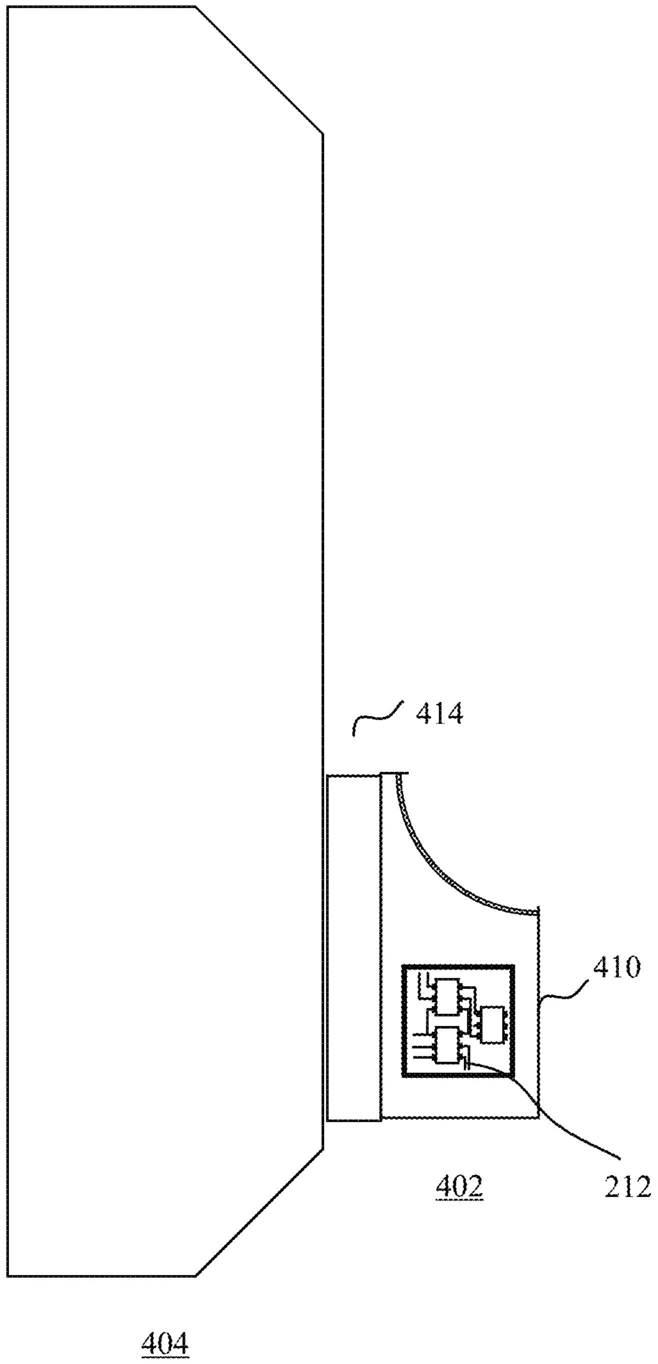
FIG. 4 shows an example environment of using an intermodulation distortion mitigation component, based on the principles disclosed herein.

FIG. 3 shows an example of antenna monitoring device 302 with an intermodulation distortion mitigation component 314 coupled thereto, based on the principles disclosed herein. When the antenna monitoring device 302 is attached to an antenna, the backplate 314 may abut the external surface of the antenna (as shown in FIG. 4). Alternatively, when the antenna monitoring device 302 is attached to a support structure of the antenna, the backplate 314 may abut the support structure. These described placements of backplate 314 are just examples, and any kind of placement that may create a radio frequency shield between the antenna and at least a portion of the antenna monitoring device 302 should be considered within the scope of this disclosure.

FIG. 4 shows an example environment 400 of using an intermodulation distortion mitigation component, based on the principles disclosed herein. As shown, a backplate 414 may be attached to a housing 410 of an antenna monitoring device 402. The antenna monitoring device 402 with the backplate 414 may be attached to an antenna 404. The backplate 414 may therefore abut the external surface of the antenna 404.

Figure 5:
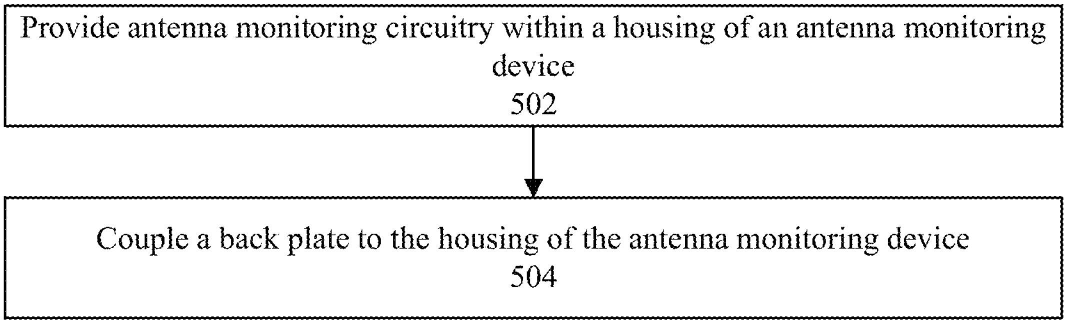
FIG. 5 shows a flow diagram of an example method of manufacturing an antenna monitoring device with an intermodulation distortion mitigation component, based on the principles disclosed herein.

FIG. 5 shows a flow diagram of an example method 500 of manufacturing an antenna monitoring device with an intermodulation distortion mitigation component, based on the principles disclosed herein. It should be understood that steps of the method 500 shown in FIG. 5 and described herein are merely examples and should not be considered limiting. Methods with additional, alternate, or fewer number of steps should be considered within the scope of this disclosure.

The method 500 may begin at step 502, wherein the antenna monitoring circuitry may be provided within a housing of the antenna monitoring device. The antenna monitoring circuitry may measure one or more antenna monitoring parameters such as roll, tilt, and or azimuth. The housing may be any shape and size that may be affixed to the antenna and or a support structure (e.g., a pole) for the antenna. The antenna monitoring circuitry may include electronic and magnetic components that may be used to determine the roll, tilt, and or azimuth of the antenna.

At step 504, a backplate (an example of an intermodulation distortion mitigation component) may be coupled to the housing of the antenna monitoring device. The coupling may be made through any kind of mechanism such as attaching with an adhesive, welding, screwing, and or any other type of coupling mechanism. The backplate may block at least a portion of the radio frequency signals distorted by intermodulation effects generated by one or more components of the antenna monitoring device. The backplate may be formed of any kind of non-ferrous material such as aluminum. The backplate may also be relatively thin, with the thickness in the order of 0.5 mm. It should however be understood that any kind of non-ferrous material with a suitable amount of thickness that can block radio frequency signals should be considered within the scope of this disclosure.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. An antenna monitoring device configured to be affixed to an antenna or a support structure associated with the antenna, the antenna monitoring device comprising:

an antenna monitoring circuitry within a housing of the antenna monitoring device, the antenna monitoring circuitry comprising electronic components configured to measure one or more antenna monitoring parameters; and an intermodulation distortion mitigation component coupled to the housing and configured to block at least a portion of radio frequency signals distorted by intermodulation effects generated by one or more components of the antenna monitoring device.

2. The antenna monitoring device of claim 1, wherein the intermodulation distortion mitigation component comprises a plate.

3. The antenna monitoring device of claim 2, wherein the plate is attached to a back side of the housing, the plate configured to abut the antenna or abut the support structure associated with the antenna.

4. The antenna monitoring device of claim 2, wherein the plate is formed by a non-ferrous material.

5. The antenna monitoring device of claim 4, wherein the non-ferrous material comprises aluminum.

6. The antenna monitoring device of claim 2, wherein the plate is approximately 0.5 mm thick.

7. The antenna monitoring device of claim 1, wherein the radio frequency signals are associated with a $5^{th}$ generation mobile network (5G).

8. The antenna monitoring device of claim 1, wherein the radio frequency signals are associated with cellular telephony, and wherein the antenna is associated with a cellular telephony network.

9. An electronic device configured to be affixed to an antenna or a support structure associated with the antenna, the electronic device comprising:

an electronic circuitry within a housing of the electronic device, the electronic circuitry comprising electronic components configured to detect one or more antenna parameters; and an intermodulation distortion mitigation component coupled to the housing and configured to block at least a portion of radio frequency signals distorted by intermodulation effects generated by one or more components of the electronic device.

10. The electronic device of claim 9, wherein the intermodulation distortion mitigation component comprises a plate.

11. The electronic device of claim 10, wherein the plate is attached to a back side of the housing, the plate configured to abut the antenna or abut the support structure associated with the antenna.

12. The electronic device of claim 10, wherein the plate is formed by a non-ferrous material.

13. The electronic device of claim 12, wherein the non-ferrous material comprises aluminum.

14. The electronic device of claim 10, wherein the plate is approximately 0.5 mm thick.

15. The electronic device of claim 9, wherein the radio frequency signals are associated with a $5^{th}$ generation mobile network (5G).

16. The electronic device of claim 9, wherein the radio frequency signals are associated with cellular telephony, and wherein the antenna is associated with a cellular telephony network.

17. A method of manufacturing an antenna monitoring device, the method comprising:

providing antenna monitoring circuitry within a housing of an antenna monitoring device, the antenna monitoring circuitry configured to measure one or more antenna monitoring parameters; and coupling an intermodulation distortion mitigation component comprising a backplate to the housing, the backplate configured to block at least a portion of radio frequency signals distorted by intermodulation effects generated by one or more components of the antenna monitoring device.

18. The method of claim 17, wherein the backplate is formed by a non-ferrous material.

19. The method of claim 18, wherein the non-ferrous material comprises aluminum.

20. The method of claim 17, wherein the backplate is approximately 0.5 mm thick.

* * * * *